Dec. 13, 1938.  C. G. SHAW  2,140,211
TAP SOLE BLANK
Filed Sept. 3, 1936   7 Sheets-Sheet 1

INVENTOR
CHARLES. G. SHAW
BY J. D. O'Connell
ATTORNEY

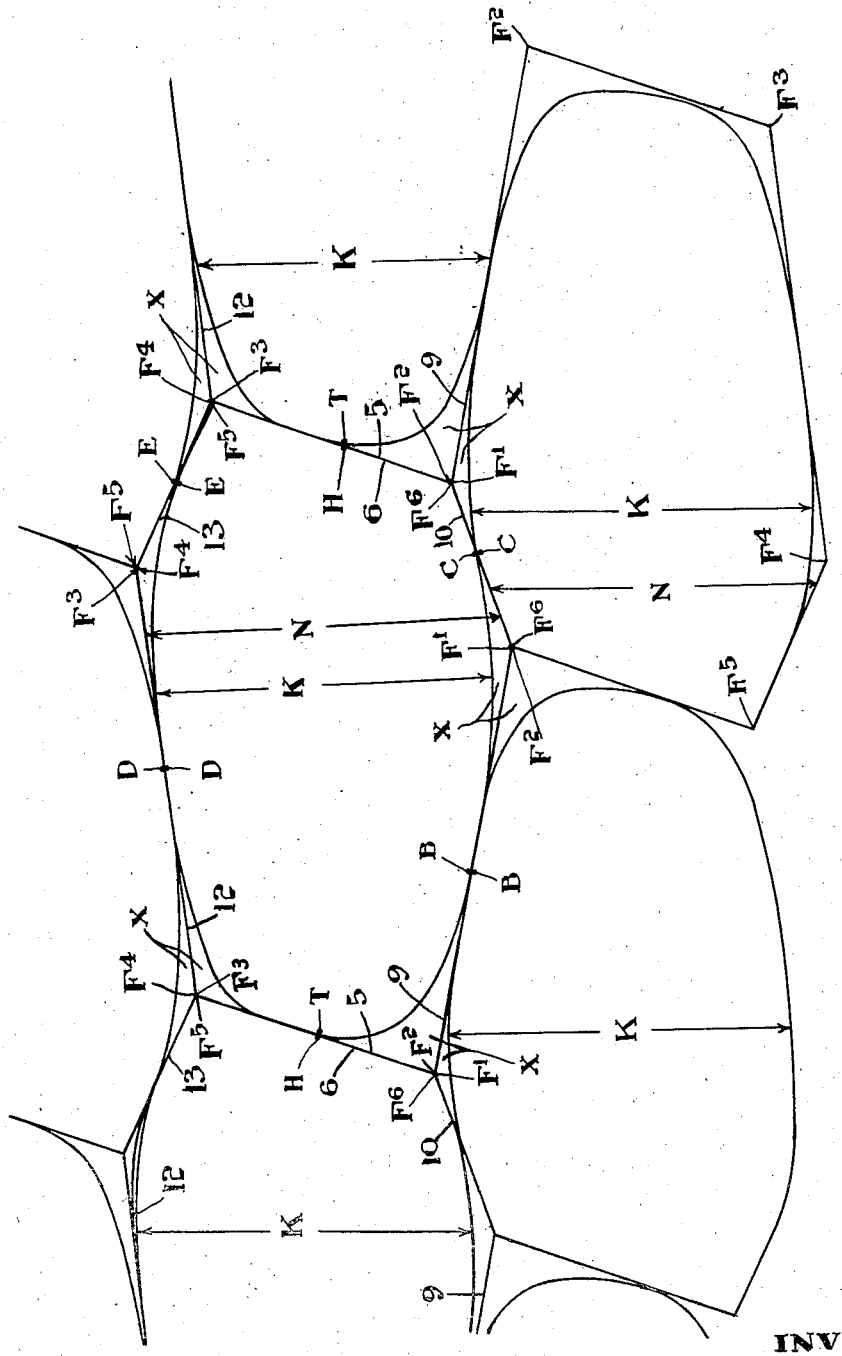

Dec. 13, 1938.     C. G. SHAW     2,140,211
TAP SOLE BLANK
Filed Sept. 3, 1936     7 Sheets-Sheet 3
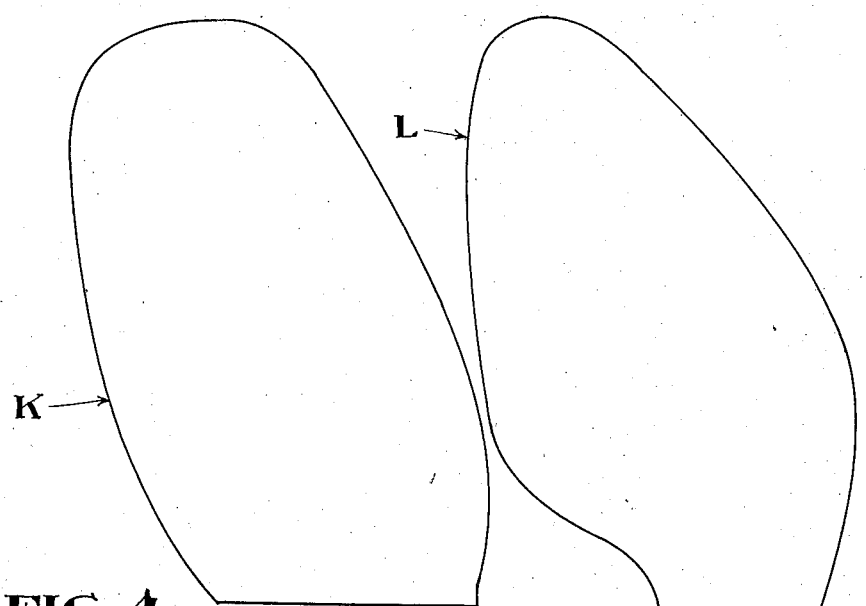
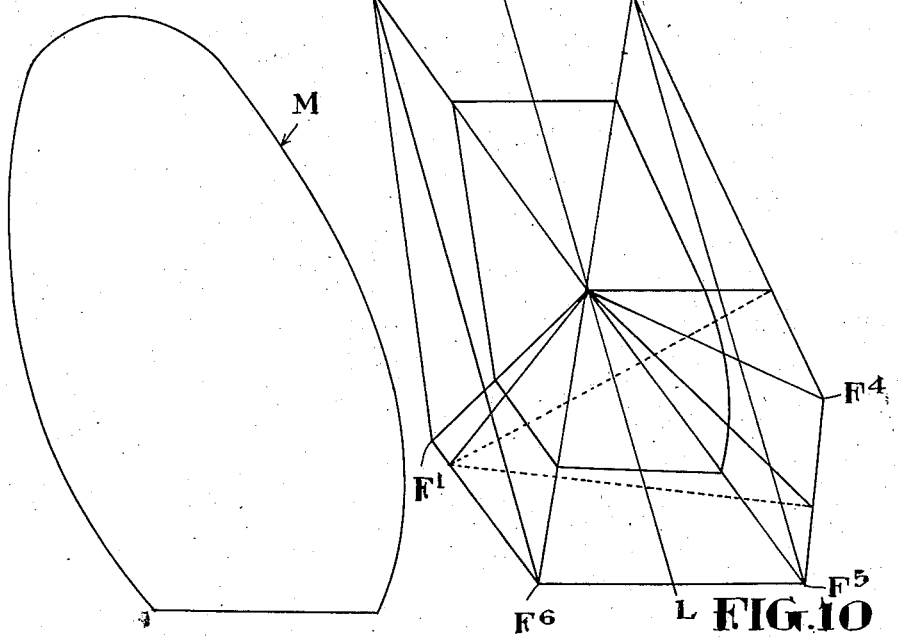
INVENTOR
CHARLES G. SHAW
BY J. D. O'Connell
ATTORNEY Dec. 13, 1938.  C. G. SHAW  2,140,211
TAP SOLE BLANK
Filed Sept. 3, 1936  7 Sheets-Sheet 4
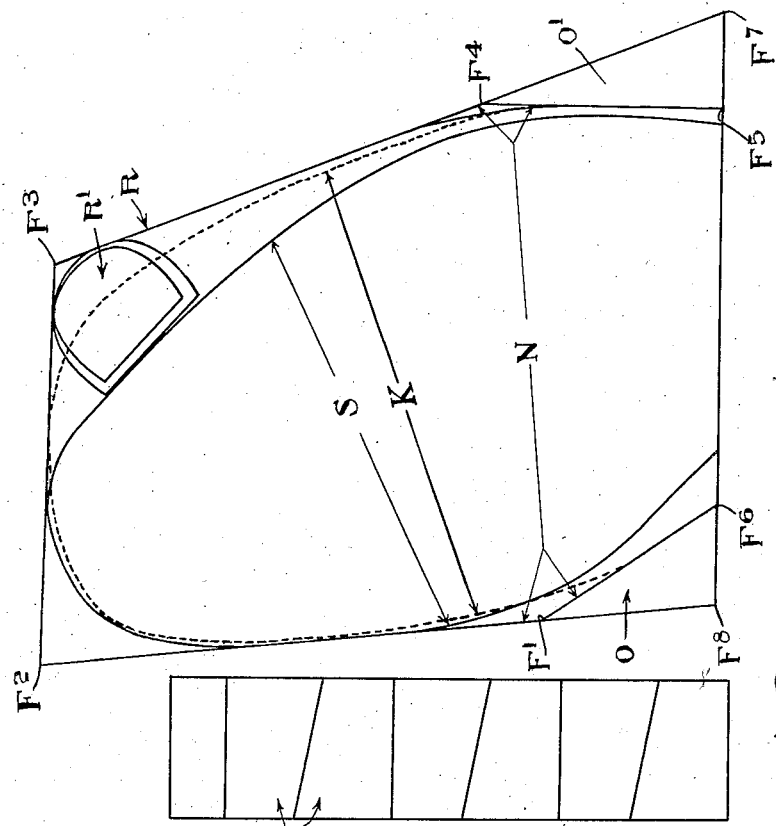
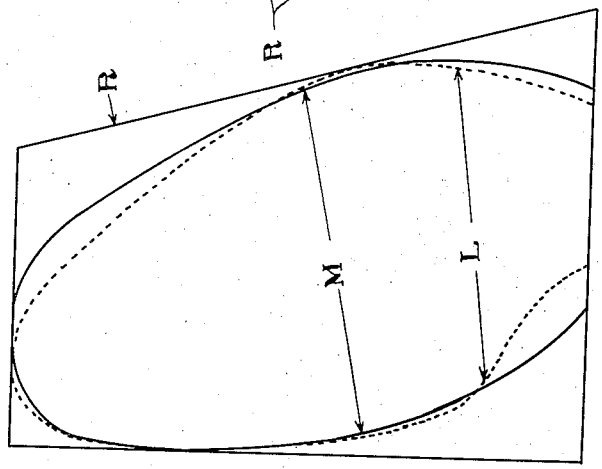
INVENTOR
CHARLES.G.SHAW
BY *J. D. O'Connell*
ATTORNEY Dec. 13, 1938.  C. G. SHAW  2,140,211
TAP SOLE BLANK
Filed Sept. 3, 1936  7 Sheets-Sheet 5

INVENTOR
CHARLES.G.SHAW
BY J. D. O'Connell
ATTORNEY

Dec. 13, 1938.                C. G. SHAW                    2,140,211
                              TAP SOLE BLANK
                       Filed Sept. 3, 1936              7 Sheets-Sheet 6
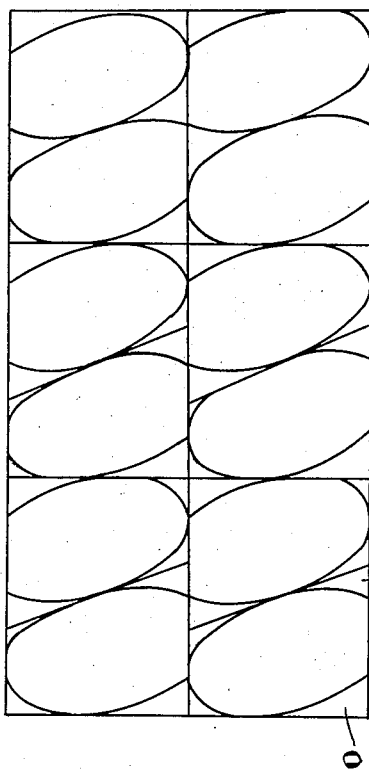
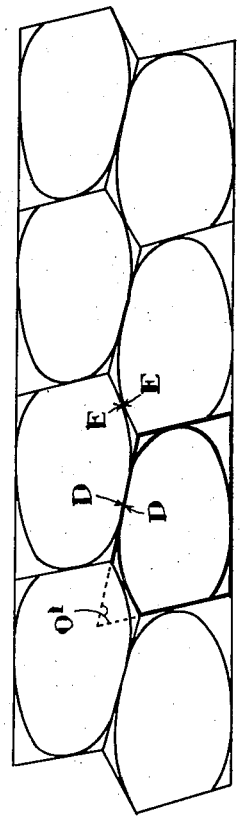
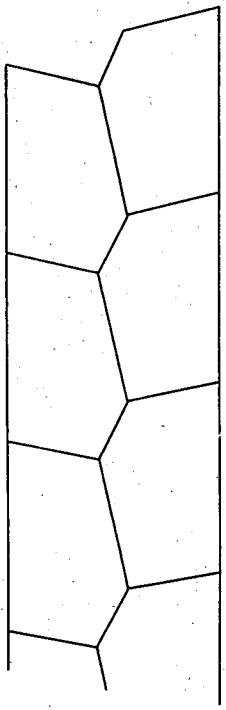
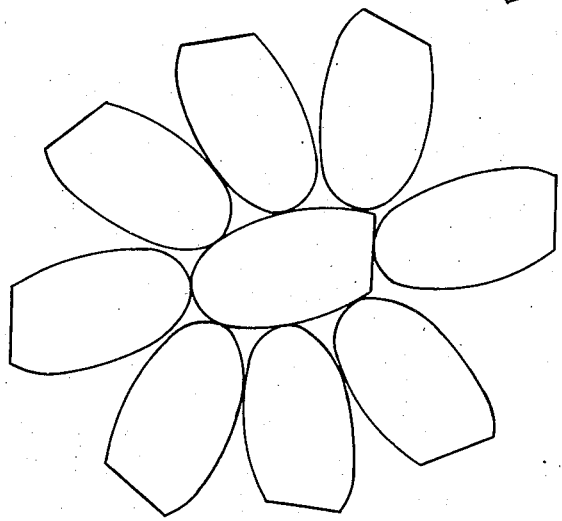
INVENTOR
CHARLES. G. SHAW
BY J. D. O'Connell
ATTORNEY Dec. 13, 1938.   C. G. SHAW   2,140,211
TAP SOLE BLANK
Filed Sept. 3, 1936   7 Sheets-Sheet 7

INVENTOR
CHARLES.G.SHAW
BY J. D. O'Connell
ATTORNEY

Patented Dec. 13, 1938

2,140,211

UNITED STATES PATENT OFFICE 2,140,211

TAP SOLE BLANK

Charles G. Shaw, Omemee, Ontario, Canada

Application September 3, 1936, Serial No. 99,198

12 Claims. (Cl. 36—25)

This invention relates to an improved tap sole and method of cutting same.

The principal object is to enable the waste, hitherto discarded in the cutting of tap sole blanks from a leather piece, to be utilized in providing an improved geometric shape which allows the greatest latitude in the fitting of the tap soles to the shoes and which will most economically cover all shapes found in the repairing of shoes. Fundamentally the invention consists in providing an improved tap sole shape by outlining a curved tap sole shape by straight lines to form an interlocking or geometric design in the cutting of which there is no waste, an increased amount of leather being included in the new shape or design by the addition of leather hitherto wasted in the cutting of the curved shapes and without diminishing the number of blanks which can be cut from the piece.

Proceeding now to a more detailed description reference will be had to the accompanying drawings, in which—

Figure 2 is a plan view illustrating the manner in which tap sole blanks of the shape shown in Fig. 1 are cut from a piece of leather. This view also illustrates the manner in which the waste characteristic of the most economical method of cutting standard curved shapes is incorporated in my improved tap sole blank so that it can be used to the best advantage by the cobbler.

Figure 4 is a plan view of a conventional died-out tap sole shape commonly used for general repairing of men's shoes.

Figure 5 is a plan view of a conventional half sole used on ladies' high heel shoes.

Figure 6 is a plan view of a conventional half sole used on ladies' low heel or walking shoes.

Figure 7 is a plan view of a well known form of "angle" tap. This view also illustrates the distribution of the waste involved in trimming the unfinished tap to produce the half sole shapes appearing in Figs. 5 and 6.

Figure 8 is a plan view illustrating the manner in which the taps shown in Fig. 7 are cut from a piece of leather.

Figure 9 is a view showing how the outline of my improved tap compares with the "angle" taps of Figs. 7 and 8.

Figure 10 is a view illustrating the manner in which my improved shape or design is adapted to the tap sole outline shown in Fig. 4.

Figure 12 illustrates a nesting method whereby the greatest number of a given tap sole shape may be made to contact with a central shape of similar size and design.

Figure 13 is a plan view illustrating a nest of curved outline tap sole shapes from which a four-sided angle tap of the American design may be derived.

Figure 14 shows, in plan, a further method of nesting whereby a five-sided figure, having improved interlocking characteristics, is developed in accordance with this invention. The interlocking shapes shown in this figure are for the same foot.

Figure 15 is a modification of Fig. 14 illustrating the nesting of a row each of right and left five-sided taps.

In Fig. 17 the two lower rows illustrate the nesting of a row each of right and left taps having "double interlocking" characteristics.

Figure 1:
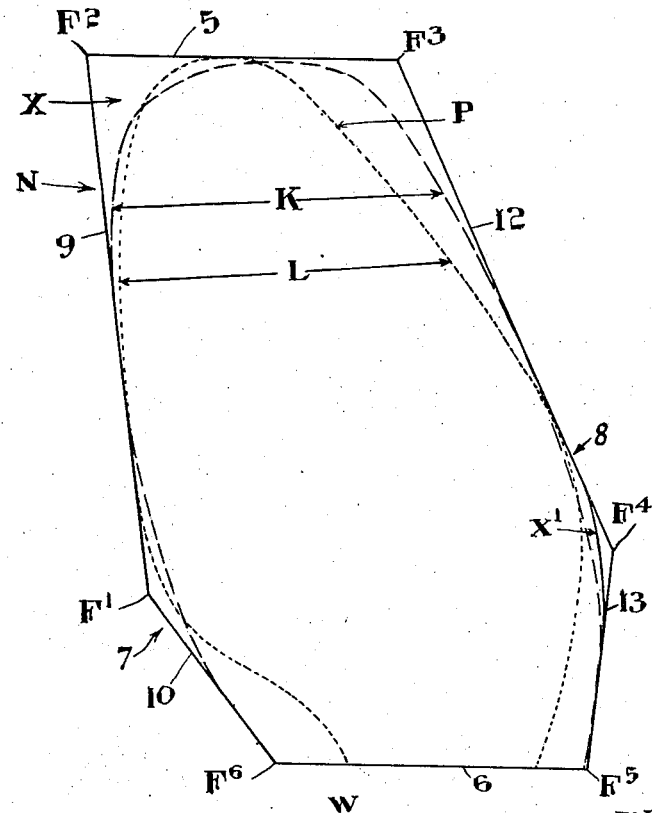
Figure 1 is a plan view of an improved tap sole blank produced in accordance with this invention. This view also illustrates the manner in which the improved shape of the blank lends itself to the production of the various finished tap sole shapes commonly used in shoe repairing.

The tap sole blank appearing in Figure 1 is bounded, at the toe and heel ends, by straight parallel edges 5 and 6. These edges, which are preferably of equal or substantially equal length, are relatively offset so that the ends of the toe edge 5 lie to the left of the corresponding ends of the heel edge 6. Thus, the greatest length of the blank is along a straight line extending from the left hand end of the toe edge 5 to the right hand end of the heel edge 6. The inner and outer sides of the blank are defined by convex edges generally indicated at 7 and 8. The inner side 7 is formed by two angularly related straight edge portions 9 and 10. The portion 9

(as viewed in Fig. 1) inclines inwardly from the left hand end F² of the toe edge 5 to an intermediate point F¹ from whence the edge portion 10 inclines inwardly at a much steeper angle to the point F⁶ where it joins the left hand end of the heel edge 6. The outer side of the blank also presents two angularly related straight edge portions 12 and 13. The portion 12 inclines outwardly from the right hand end F³ of the toe edge 5 to an intermediate point F⁴ from whence the edge portion 13 inclines inwardly to the point F⁵ where it meets the right hand end of the heel edge. Thus, the greatest width of the blank is along the straight line connecting the points F¹ and F⁴. It will also be seen that the blank gradually increases in width from the points F² and F³ to the intermediate points F¹ and F⁴ and then gradually diminshes in width toward the points F⁵ and F⁶.

Figure 3:
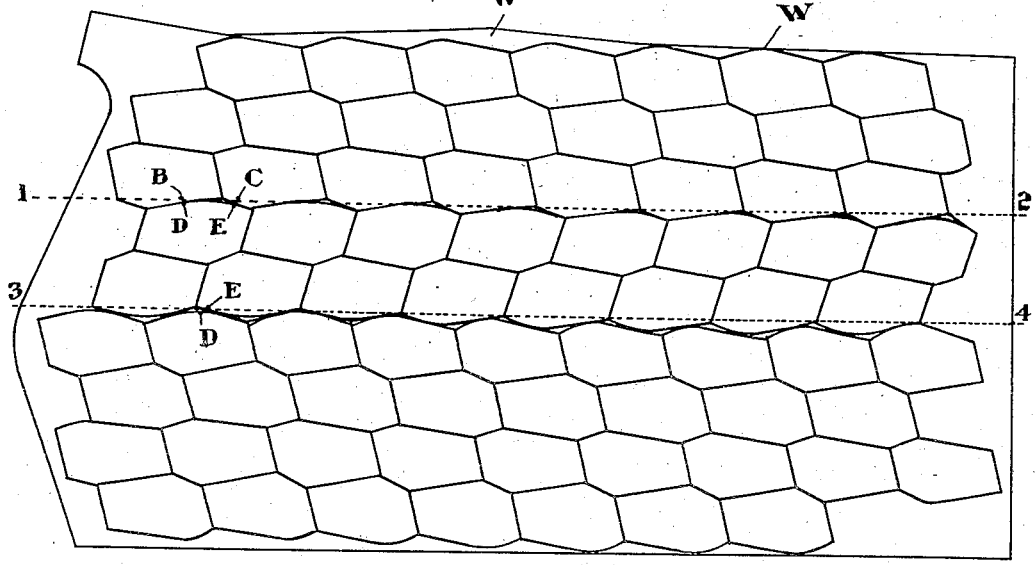
Figure 3 is a view similar to Fig. 2 but showing a slight modification.

The length and angular relation of the edges 5, 6, 9, 10, 12 and 13 are such that a plurality of the blanks will nest together in the particular interlocking relation shown in Figs. 2 and 3.

The method of cutting the improved blanks from a piece of leather will now be explained in connection with Fig. 2. In this figure I have shown the most economical nesting which can be resorted to in cutting tap soles of the shape shown in Fig. 4 from the piece. It will be noted that these tap sole shapes, indicated at K, are arranged in rows with the toe end of each shape placed against the heel end of an adjoining shape in the same row, the points B, C, D and E of each shape being arranged to coincide with similar points of reversely arranged shapes contained in the adjoining rows. This method of nesting is the most economical in eliminating waste in the cutting or dieing out of the shapes shown in Fig. 4. However, owing to the imperfect nesting or interlocking of the shapes K it does leave waste areas X which have little value as scrap. The advantage of the present invention is that these waste areas are added to the improved tap sole blank so that they can be used to advantage by the cobbler in trimming the blank to provide a wider variety of finished shapes than has heretofore been possible. In this connection it will be noted that the shaded areas X, representing the waste, may be bisected or divided by straight lines drawn through the points B, C, D and E and across the toe and heel ends of the tap sole shape K to define a tap sole blank N outlined by straight lines or edge portions 5, 6, 9, 10, 12 and 13 connecting the points F¹, F², F³, F⁴, F⁵ and F⁶. It will also be noted that each of the improved tap sole blanks thus outlined is nested or interlocked with adjacent blanks of similar outline so that there is no waste in the cutting of these shapes from the piece. In this connection it will be noted that the relative position of the blanks or taps N is such that points F¹ of each tap coincides with points F² and F⁶ of adjacent reversely arranged taps N while points F² of each tap similarly coincides with points F¹ and F⁶ of adjacent taps. Points F³ of each tap coincides with points F⁵ and F⁴ of adjacent taps while points F⁴ of each tap coincides with points F³ and F⁵ of adjacent taps. Point F⁵ of each tap coincides with points F⁴ and F³ of adjacent taps while point F⁶ of each tap coincides with points F² and F¹ of adjacent taps. It will also be observed that, with this method of interlocking, the points B, C, D and E of each of the shapes outlined at K, coincide with like points of adjacent taps and that point T, representing the center point of the toe, coincides with H, representing the center point of the heel cut of an adjacent tap. It will thus be seen that in cutting a piece of leather to provide the shape N shown in Fig. 1, I obtain a blank which includes within its boundaries part of each portion X which is wasted in the dieing out of the shapes K, even when the latter are nested together in the most economical fashion illustrated in Fig. 2. The new shape of blank thus produced has improved advantages over any other tap sole shape heretofore known to the art in that it eliminates all waste in the cutting of the blanks from the piece and provides a shape from which a great variety of finished half sole shapes may be cut. It will be noted, for instance, that the improved shape shown in Fig. 1 may be trimmed to the dotted outline K to produce a finished half sole shape of the type illustrated in Fig. 4 or to the dotted outline L to produce a finished half sole shape of the type illustrated in Fig. 5. In the latter instance it will be noted that the toe of the shape L extends into a part of one of the waste areas X, which is added to the blank in accordance with my invention. In Fig. 1 it will be seen that the angularity of a tap sole blank cut to the shape shown in Fig. 4 is insufficient to accommodate the sharp curvature of such soles as that appearing in Fig. 5, whereas my improved blank lends itself with equal facility to the cutting of either of the half sole shapes represented in Figs. 4 and 5. It is also obvious that half sole shapes M of the type shown in Fig. 6 can be cut from my improved blank with the same facility as the shapes shown in Figs. 4 and 5.

The practice of cutting tap sole blanks to the rounded shape indicated at K in Figs. 2 and 4 has no real advantage and is uneconomical in that it leaves waste parts X which, when actually added to the blank to provide the new shape contemplated by the present invention, enable the cobbler to trim the blank to a greater variety of finished shapes and do not add to the cost of the blank. It will also be seen that, in trimming my improved blank to provide a finished shape of the outline L shown in Fig. 5 there would be a relatively large piece of leather P (Fig. 1) trimmed off which is of such size as to be of some use to the repair man whereas if the blank were rounded the piece trimmed off at this point would be of no value. Also in trimming such sole shapes as S (see Fig. 9 where the lines connecting points F¹—F², F²—F³, F³—F⁴, F⁴—F⁵, F⁵—F⁶, F⁶—F¹ represent the outline of one of my improved tap sole blanks superposed on a conventional angle tap represented by lines connecting points F²—F³, F³—F⁷, F⁷—F⁸, F⁸—F²) in order to utilize the full length of the improved tap sole shape, the more pointed toe is carried over towards the angle at F² which leaves a quite large piece of leather at R' sufficient in area to form the top lift for a woman's "spike" or "Louis" heel. It will be noticed that this piece R would have been partly wasted on the cutting floor during the dieing-out operation, and that the other part would have been wasted in trimming such a shape as K to the sole shape S.

In designing tap sole blanks of the type shown in Fig. 4 to obtain certain characteristics in the curved shape no regard is paid to other characteristics which have marked bearing on the interlocking properties of the blank and is an important consideration in the provision of shapes which can be cut from the piece with a minimum amount of waste. Consequently, in designing tap blanks of the type here referred to considerable leather is quite often needlessly wasted and the general utility of the blanks needlessly limited. This objection does not apply to the new shape produced in accordance with this invention since this shape lends itself to the use of simple geometrical methods in effecting a change in design and general proportions.

Another advantage of the tap blank produced in accordance with the present invention is that its shape may be readily defined by angles and straight lines whereas the curved shape and angularity of the tap blank appearing in Fig. 4 provides a practically indescribable outline. The repair man, for instance, may find that the shape shown in Fig. 4 is deficient in the "swing" which is an expression generally used to designate the relative position of a line, drawn as the center line from toe to heel, with respect to the contours of the outline and the angularity of the cut across the heel end of a tap blank. Such swing is easily definable in the improved tap blank produced in accordance with this invention since the angularity is both apparent and measurable and can be easily corrected where such correction is necessary or desired. A further advantage of the tap blank produced in accordance with the present invention is that, in dieing out these blanks, the dies may be easily and quickly placed in position on the straight line boundaries of the blank previously cut so that no waste occurs in filling the die. In this connection it may be explained that, in dieing out the curved shape shown in Fig. 4, the mistake is frequently made of not quite filling the die which results in an indentation in its outline due to the encroachment of the sole previously cut. Such faults in dieing out curved shapes of the type shown in Fig. 4 result in objectionable disfiguration which is not readily discernible in the dieing of the straight edge taps contemplated by the present invention. The straight edge shape therefore speeds up and improves the efficiency of the cutting operation.

In producing the improved tap blank shown in Fig. 1, it may be advisable to slightly round the corner or angle $F^4$ as indicated at $X^1$ since, in placing the die around the margin of the piece of leather from which the taps are cut, the sharp angle $F^4$ projects in a manner to make the marginal waste W (Fig. 3) of greater extent. If the cutting die is slightly rounded to cut the blank along the line $X^1$ instead of the sharp angle $F^4$ in Fig. 1 this portion of the die may therefore be placed closer to the edge of the piece, as shown in Fig. 3, so that the size of the waste marginal piece W will be correspondingly reduced. It is also pointed out that the angles $F^1$, $F^2$ and $F^3$ of the shape shown in Fig. 1 may also be slightly rounded without materially impairing the ability of this shape to give an economical interlock with similar shapes and such modification is therefore considered to fall within the scope of the present invention.

The nesting or interlocking of the tap blank shapes illustrated in Fig. 2 is particularly adaptable to the cutting of right taps only from the same piece. If it is desired to cut both right and left taps this is conveniently accomplished by changing from a right to a left die along the developed cutting line designated 1—2 in Fig. 3. This involves an interchange in the nesting or interlocking of the improved shapes which is clearly indicated in Fig. 3. As here shown the left hand tap appearing directly below the line 1—2 is arranged so that its points D and E coincide respectively with the points B and C of the adjacent upper taps. A similar interchange may be effected along the cutting line 3—4 of Fig. 3 by placing the point E of the taps above said line so as to approximately coincide with the points D of the next lower taps. It will thus be seen that, while the shape of the improved tap enables it to interlock with similar taps to prevent waste in the cutting operation, it presents no disadvantage with respect to right and left cutting in comparison with ordinary shapes such as shown in Fig. 4.

In addition to its advantages, in comparison with curved shapes of the type shown in Fig. 4, the improved tap blank shape contemplated by this invention also has certain advantages in comparison with angle taps such as shown at R in Figs. 7, 8 and 9. As indicated in Fig. 7 these angle taps are relatively crude in their outline as regards the waste of leather involved in trimming them to provide finished shapes of the type shown in Figs. 5 and 6. In trimming an angle tap to produce the half sole shape K the corner pieces designated O and $O^1$ in Fig. 9 are invariably trimmed off and wasted in applying the angle tap to the shoe. According to the present invention these areas are utilized to form a part of the improved tap sole shape which is not wasted or trimmed off. This will be apparent from a comparison of the shapes R and N in Fig. 9.

Figures 11, 20:
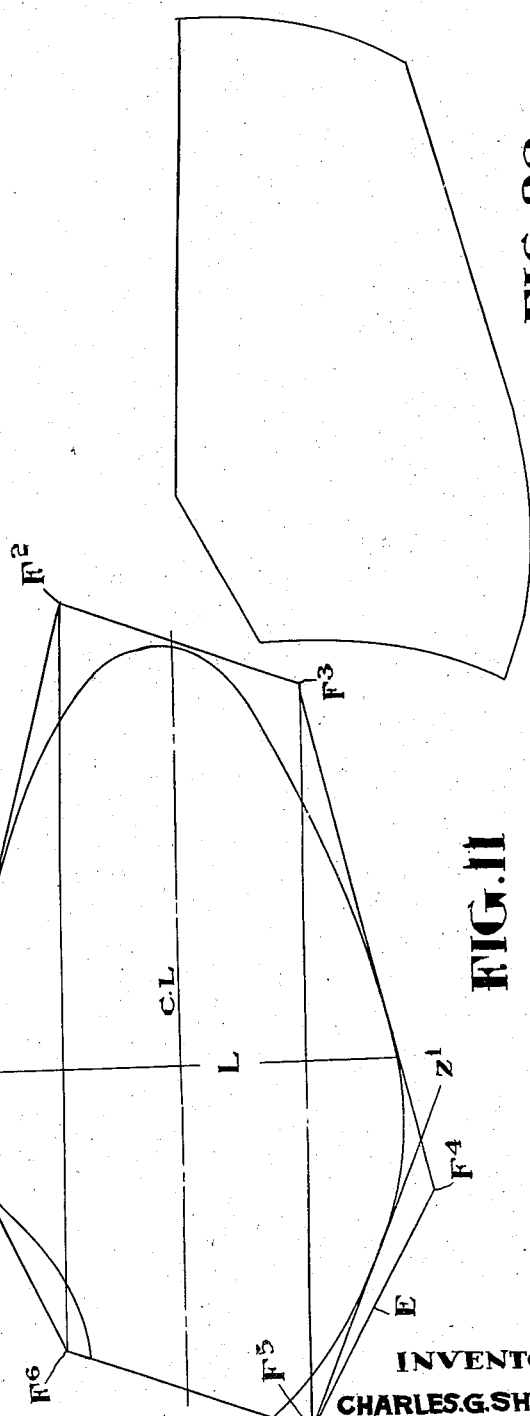
Figure 11 is a view illustrating the manner in which my improved shape or design is adapted to the tap sole outline shown in Fig. 5.
Figure 20 is a plan view of an improved tap sole blank, similar to Fig. 1, but having curved heel and toe edges.

Fig. 11 illustrates the manner in which my improved interlocking design may be adapted to the shape L appearing in Fig. 5. As here shown a center line CL is drawn lengthwise from toe to heel. A heel line $F^6$—$F^5$ of convenient length is drawn across the heel cut and a toe line $F^2$—$F^3$ of the same length as the heel line is drawn across the toe cut, the exact length of the heel and toe lines being dependent upon the angularity desired on the sides of the tap. In the particular case under consideration shape L is seen to have quite angular characteristics and it is desirable to produce the normal heel cut some distance beyond the heel cut of the outline L in order to reduce the sharp angularity of the points $F^1$, $F^4$ hereinafter referred to in connection with Fig. 11. With the length of the heel and toe cuts thus determined, parallel lines $F^3$—$F^5$ and $F^2$—$F^6$ (Fig. 5) are drawn parallel to CL, joining the ends of the toe and heel cuts. From $F^2$ a line is drawn $F^2$—$F^1$ touching or approximating the outline of the tap sole shape L, and similarly a line $F^6$—$F^1$ is drawn intersecting $F^2$—$F^1$ at $F^1$, thus forming a triangle $F^2$—$F^6$—$F^1$ on the base $F^2$—$F^6$. Similarly on the base $F^3$—$F^5$ a triangle is formed $F^3$—$F^5$—$F^4$. It will be noticed that $F^4$—$F^5$ does not touch the outline L. It will also be noticed that the two triangles having their apices at $F^1$ and $F^4$ are equal and inversely similar in every respect. With this characteristic the improved tap sole shape is said to have double interlocking characteristics. Should the line $F^4$—$F^5$ be made to closely conform to the outline L (as represented by line Z—Z') the improved shape would be formed of dissimilar triangles on either side and would then have single interlocking characteristics, the waste area at $F^4$—$F^5$ being of such small dimension it is negligible in this instance and the double interlocking characteristic should, no doubt, be retained. The terms "double interlocking" and "single interlocking" as applied to my improved tap designs may be explained as follows. When the two triangles having their apices at $F^1$ and $F^4$ are equal and inversely similar, taps of the improved shape shown in Fig. 11 will interlock perfectly when cut, as shown above the developed cutting line 1—2 of Fig. 3 and will also interlock perfectly on said cutting line 1—2 on a change from right to left die. Such taps are therefore said to have "double interlocking" characteristics. On the other hand, shapes in which the two triangles having their apices at $F^1$ and $F^4$ are dissimilar will interlock perfectly when cut as shown above line 1—2 of Fig. 3 but will not interlock perfectly on said cutting line 1—2 on a change from right to left die. These latter taps are therefore said to have "single interlocking" characteristics.

Compared with Fig. 5, Fig. 10 presents a similar problem with the length of the toe and heel cut longer proportionately to the shape to accommodate the more symmetrical outline of Fig. 4 and, in this instance, the angles at the apices of the triangles $F^1$, $F^4$ (Fig. 10) are less acute. It will also be noted that, in this instance, double interlocking characteristics have not been maintained but closely approximated, there being a slight dissimilarity in the two angles having their apices at $F^1$ and $F^4$.

With the tap sole shape thus reduced to a rectilineal figure, the change in size may be accomplished by ordinary geometrical methods. Changes of proportion may be accomplished by obvious methods of shortening or lengthening the toe or heel cut or the length of the line CL and by modification of the characteristics of the triangular sides, variations in this respect clearly being indicated in comparing Fig. 5 with Fig. 10, and the sole outline L with K.

The essence of this invention is to outline a curved outline tap sole shape by straight lines to form an interlocking or geometrical design in the cutting of which there is no waste. With this in view a study of the characteristics of customary tap sole shapes will be considered. At present these are characterized generally by a straight cut across the heel, though in some instances there are designs still in use employing a re-entrant curve instead of a straight heel cut. In general tap sole shapes such as outline L (Fig. 5) are not resorted to, that is, having a re-entrant curve as between $F^1$ and the heel cut (Fig. 11). In general it will be noted that the outline of a tap has ovoid characteristics, the outline having no re-entrant curvature and such outline, other than the heel cut, may therefore be formed of numerous arcs of circles with various centres. Therefore, two tap soles with such an outline can touch at only one point. Through this point a tangent may be drawn. Hence when four tap soles touch a given shape, four tangents may be drawn and a four, straight-sided tap sole shape (Fig. 13) results. Similarly when five tap soles touch a given tap sole shape, a five straight-sided tap sole shape is secured (Fig. 14) and when six tap soles touch a given tap sole shape, the preferred six straight-sided tap sole shape of this invention (Figs. 16 and 17) is derived.

As in my method of cutting, the toe is always placed adjoining the heel cut, and, as the toe of all sole shapes is rounded the heel cut may have a re-entrant curvature conforming wholly or partially to the shape of the toe. This of no real advantage as it is generally found undesirable by the repairman to have a curved heel cut and the tendency is now towards straight heel cuts on tap sole shapes. The re-entrant curvature of L (Fig. 5) for purposes of elimination of waste in cutting is not necessary, and such exceptional re-entrant curvature need not be considered a general characteristic of tap sole shapes.

As stated before, the object of this invention is to place tap sole shapes in an arrangement so as to eliminate as much waste as possible in the cutting thereof. It is apparent that such an arrangement must be symmetrical. I will now endeavour to show that six tap sole shapes touch any given tap sole to form the most satisfactory symmetrical, interlocking arrangement.

Assume that more than six or as many shapes as possible are arranged radially to touch a given tap sole shape (Fig. 12). Only eight can be so arranged around a central one, but this is obviously impractical in view of the amount of waste involved in cutting.

Assume that the shapes are arranged transversely in a reverse position to cut in strips (Fig. 13). This makes a four sided tap sole shape as the angle tap (Figs. 8 and 9) on which I am endeavouring to improve.

Assume that the shapes are arranged toe to heel longitudinally, with a second row in a reverse position, similar points E and E, D and D (compare Figs. 14 and 2) coinciding. The waste area between the two rows can be divided by straight lines through the tangential points thus forming a five-sided tap sole shape, illustrating single interlock (Fig. 14). In comparing Fig. 13 with Fig. 14 it will be noted that the waste area, $O^1$, (Fig. 13) has been eliminated from each sole shape in Fig. 14.

Assume that the shapes are arranged longitudinally with a second row in reverse position, and similar points E and E, D and D coinciding. Suppose a third row be added similarly and the waste between each row bisected by straight lines drawn tangentially through the points of contact. A six-sided tap sole (Fig. 16) shape has now been formed, and arranged in a single interlocking position. In comparing the Figs. 13 and 16, it will be noted that both waste areas O and $O^1$ (Fig. 13) have been eliminated in Fig. 16.

Figure 16:
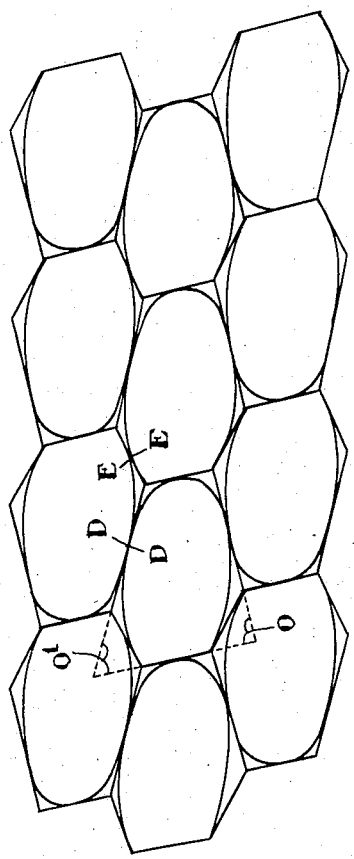
Figure 16 is a further development of nesting similar to Fig. 14 whereby a six-sided figure is derived, the taps shown in this figure being all for the same foot.
Figure 17:
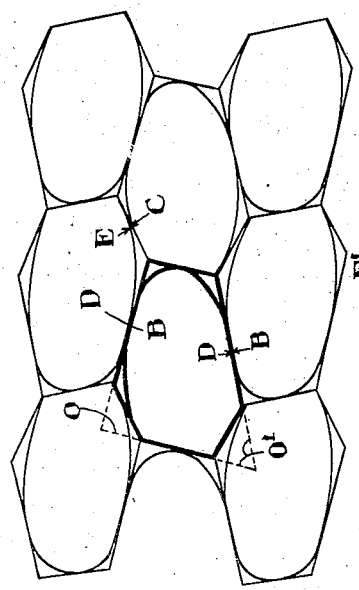
Figure 17 is a modification of Fig. 16.

Fig. 17 shows a double interlocking arrangement of a six-sided shape arranged so as to cut alternate rows of right and left with entire elimination of waste areas O and $O^1$, as in Fig. 16, which typifies single interlock only. It will be noted in this position that points B and D, and E and C are respectively placed adjacent to each other. This is a characteristic of double interlock.

From the characteristic of the lay-out as shown in Fig. 3, it will be noted that the parallel toe and heel cuts produce straight lines of tap soles when placed toe to heel as in Fig. 3. It thus forms groups of regular geometrical design characterized by body parts contained within straight parallel lines as shown (Fig. 18) AB, XY and the interlocking, triangular parts contained between the parallel straight lines XY and OM.

For purpose of geometric proof of interlock, assume the simplest form of tap sole shape (Fig. 18) i. e., the straight shape, which is neither right nor left, and which may be defined as: a rectangle forming the body of the tap sole shape $F^2$—$F^3$—$F^5$—$F^6$, the two shorter sides of which form the heel edge $F^5$—$F^6$ and toe edges $F^2$—$F^3$ of the tap. Two equal and inversely similar triangles are superimposed on the figure, with the longer sides $F^3$—$F^5$ and $F^2$—$F^6$ forming bases, the more acute angles at the base, $F^3$—$F^5$—$F^4$ and $F^2$—$F^6$—$F^1$ being at the toe end of the shape.

Arrange a plurality of these shapes in a row with toe and heel lines coinciding. Because $F^2$—$F^3$—$F^5$—$F^6$ is a rectangle therefore, $F^2$—$F^3$ is parallel to $F^5$—$F^6$, and $F^3$—$F^5$ is parallel to $F^2$—$F^6$.

Since these shapes are placed end to end, we have a series of rectangles placed end to end and, therefore, the angles at $F^3$ along AB equal two right angles (also the angles at $F^5$) and similarly the angles at $F^2$ along XY equal two right angles (also the angles at $F^6$) and therefore AB and XY are straight parallel lines.

Figure 19:
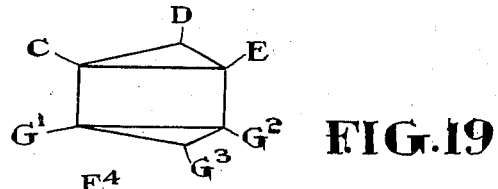
Figure 19 is a detached view of a six-sided tap sole shape defined by lines connecting the points $F^1$, $F^6$, $F^7$, $G^2$, $G^3$ and $G^1$ of Fig. 18.

Join $F^1$—$F^7$ (Fig. 18) and construct an additional tap sole shape (Fig. 19) E, D, C, $G^1$, $G^3$, $G^2$, similar and equal in every respect to the tap sole shape $F^1$—$F^2$—$F^3$—$F^4$—$F^5$—$F^6$ but in a reverse position:

Angle $F^2$—$F^6$—$F^1$ equals angle DCE (equal and inversely similar figures)

Angle $F^7$—$F^6$—$F^8$ equals angle DEC (equal and inversely similar figures)

Angle $F^2$—$F^6$—$F^1$ angle $F^1$—$F^6$—$F^7$ angle $F^7$—$F^6$—$F^8$ equals 180°

Angle DCE angle CED angle EDC equals 180° (3 angles of any triangle equal two right angles)

Therefore angle $F^1$—$F^6$—$F^7$ equals angle EDC and because $F^1$—$F^6$ equals CD—equal sides of similar figures and because $F^7$—$F^6$ equals ED—equal sides of similar figures.

Therefore: Triangle $F^1$—$F^6$—$F^7$ equals triangle CDE

And therefore: The figure CDE fits perfectly into the space outlined by $F^1$—$F^6$—$F^7$. Similarly, other triangular outlines in line 18 can be proven to fit up into line 17.

Because angle $F^2$—$F^6$—$F^1$ equals angle $F^6$—$F^1$—$F^7$ and because $F^1$—$F^6$ is a diagonal on lines $F^2$—$F^8$ and $F^1$—$F^7$ Therefore: $F^2$—$F^8$ is parallel to $F^1$—$F^7$ and in Fig. 18 AB is parallel to XY is parallel to OM.

Figure 18:
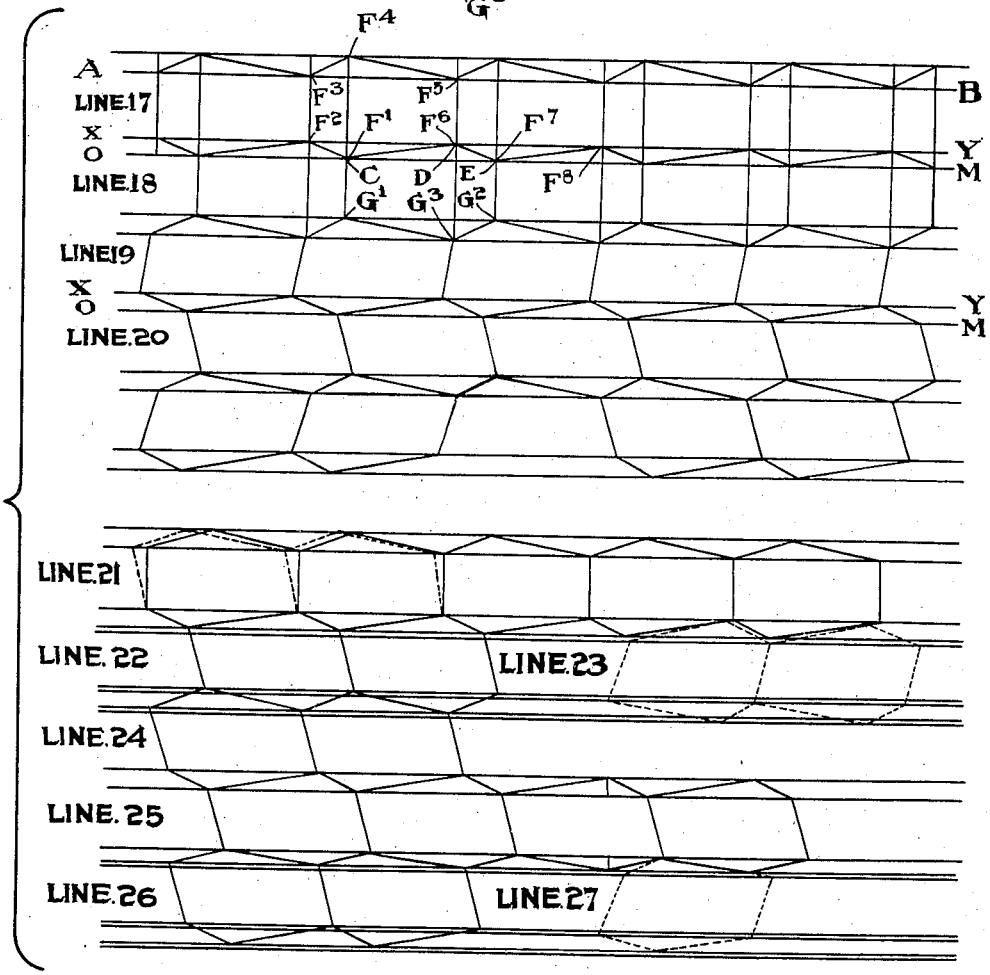
Figure 18 illustrates a proof of the interlock and variations thereof.

Having thus proven the principle of interlock with the straight shape—neither right nor left, Fig. 18 (lines 17 and 18) I shall progress to the shapes accommodated to either right or left foot.

This change is accomplished by swinging the rectangular portion of the tap into a parallelogram of the same height, between the same parallel straight lines A—B, X—Y. It is obvious that this change does not in any way affect the interlock, as the opposite equal triangles upon which the interlock depends, are still contained between the same parallel straight lines X—Y, O—M. Hence given the superimposed triangles with equal sides and equal altitudes, a perfect double interlock is secured and such tap sole shapes may be arranged to cut alternate rows of right (line 19) and left (line 20).

Assume that the sides of a tap sole shape are made unequal to accommodate an awkward shape, that is, a shape the interlocking triangles of which are of equal altitude but with dissimilar sides. Then the triangles on either side of the shape become unequal and only a single interlock can be secured, (lines 21, 22 and 24), because unequal triangles will not interlock, (line 23).

Assume that one side of a tap sole shape is made less acute than the other, that is, the one side has a triangle of lesser altitude than the other, and thus contained between closer parallel lines in the interlock of this side than the other. In this case, also, the interlock will be single only, (line 26), because the altitudes of the opposite triangles are now unequal, and hence double interlock is impossible, (line 27).

The advantages of this invention are not only in the shape of the tap sole itself but also in the various patterns into which they can be most economically nested. An object of merit in this invention would, therefore, be to emboss the outline of such nests of tap soles upon such a piece of leather as the bend, Fig. 3, or a strip, Figs. 14, 15, 16 and 17. This would act as a guide for the repairman in using the piece or strip to best possible advantage but not necessarily confining him to the shape of tap sole if he desired to use the leather otherwise.

To facilitate the uniform sale of all grades and thickness of tap soles cut from bends, a bend or piece may be laid out in a manner similar to Fig. 3, or Figs. 14, 15, 16 and 17, the outline of the taps being partly cut to facilitate the rapid completion of the cut by the repairman. Thus the manufacturer's cutting and packing cost is greatly reduced, his stock of tap soles sold in balanced proportion and the repairman given the advantages of this invention at a reduction in cost compared to cut soles in packages.

Having thus described my invention, what I claim is:

1. A tap sole blank having at least one convex side defined by two angularly related straight edge portions converging to form two unequal sides of a triangle, the base of which lies on and is coextensive with a straight line joining the extremities of the toe and heel edges of the blank on the same side, said blank containing, within its boundaries, the amount of material usually contained in a standard curved tap sole shape plus additional material ordinarily wasted in cutting curved shapes directly from a piece of material.

2. A tap sole blank as set forth in claim 1 characterized in that the blank is rounded off or curved at one or more of the points corresponding, respectively, to the summit and to the intersections of the sides with the base of the triangular portion of the blank.

3. A tap sole blank cut from a piece of material so that it includes, within its boundaries, the amount of material usually contained in the largest size of standard curved tap sole shape that can be cut from the piece plus the addition of material ordinarily wasted in cutting a plurality of curved shapes directly from the piece, said blank presenting convex side edges, the inner side edge being defined by two angularly related straight edge portions following closely the curvature at the inner side of a standard curved tap sole shape and forming two unequal sides of a triangle, the base of which lies on and is coextensive with a straight line drawn between the inner ends of the heel and toe edges of the blank, the outer side of said blank being similarly defined by two angularly related straight edge portions following closely the curvature at the outer side of a standard curved tap sole shape and also forming two unequal sides of a triangle, the base of which lies on and is coextensive with a straight line drawn between the outer ends of the heel and toe edges of the blank.

4. A tap sole blank as set forth in claim 3 in which the toe and heel edges are straight and parallel.

5. A tap sole blank as set forth in claim 3 in which the toe and heel edges are curved so that the curved toe edge of one blank will fit the curved heel edge of another blank when a plurality of the blanks are arranged in a row with the toe edge of one blank abutting the heel edge of an adjacent blank.

6. A tap sole blank cut to the outline of a geometrical figure including, within its boundaries, the amount of material usually contained in the largest size of standard curved tap sole shape that can be cut from a piece of material plus the addition of material which is ordinarily left as waste between the curved shapes when a plurality of such curved shapes are cut directly from the piece, said figure substantially corresponding to that obtained by superimposing a scalene triangle on each of the longer opposite sides of a parallelogram in such manner that the longest side of each triangle coincides with one of the said longer sides of the parallelogram and is co-extensive therewith.

7. A tap sole blank cut to the outline of a geometrical figure including, within its boundaries, the amount of material usually contained in the largest size of standard curvel tap sole shape that can be cut from a piece of material plus the addition of material which is ordinarily left as waste between the curved shapes when a plurality of such curved shapes are cut directly from the piece, said figure substantially corresponding to that obtained by superimposing a scalene triangle on each of the longer sides of a rhomboid parallelogram in such manner that the longest side of each triangle coincides with one of the said longer sides of the parallelogram and is co-extensive therewith.

8. A tap sole blank cut to the outline of a geometrical figure including, within its boundaries, the amount of material usually contained in a standard curved tap sole shape plus additional material ordinarily wasted in cutting a plurality of curved shapes directly from a piece of material, said figure substantially corresponding to that obtained by superimposing a scalene triangle on each of the longer sides of a parallelogram in such manner that the longest side of each triangle coincides with one of the said longer sides of the parallelogram and is co-extensive therewith, the two triangular portions of the figure being equal and inversely similar.

9. A tap sole blank cut to the outline of a geometrical figure including, within its boundaries, the amount of material usually contained in a standard curved tap sole shape plus additional material ordinarily wasted in cutting a plurality of curved shapes directly from a piece of material, said figure substantially corresponding to that obtained by superimposing a scalene triangle on each of the longer sides of a rhomboid parallelogram, in such manner that the longest side of each triangle coincides with one of the said longer sides of the parallelogram and is coextensive therewith, the two triangular portions of the figure being substantially equal and inversely similar.

10. A tap sole blank cut to the outline of a geometrical figure including, within its boundaries, the amount of material usually contained in a standard curved tap sole shape plus additional material which is ordinarily left as waste between the cuts made in cutting a plurality of the curved shapes directly from a piece of material, said figure substantially corresponding to that obtained by superimposing a scalene triangle on each of the longer sides of a parallelogram in such manner that the longest side of each triangle coincides with one of the said longer sides of the parallelogram and is co-extensive therewith, the remaining sides of each triangular portion of the figure being of dissimilar length as compared with corresponding sides of the companion triangular portion of the figure.

11. A tap sole blank including, within its boundaries, the amount of material usually contained in the largest size of curved tap sole shape that can be cut from a piece of material plus the addition of material which is ordinarily left as waste between the cuts made in cutting a plurality of the curved shapes directly from the piece, said blank having convex sides, each defined by two angularly related edges converging along straight lines closely approximating the curvature at one side of a standard curved tap sole shape, to form a triangle, the base of which lies on and is co-extensive with one or two parallel lines connecting corresponding ends of the heel and toe edges of the blank, said blank being further characterized in that the altitudes of the two triangles are unequal.

12. A tap sole blank having convex sides each defined by two angularly related converging straight edges following closely the curvature at one side of the largest size of standard curved tap sole shape that can be cut from a piece of material, thus forming a triangle the base of which lies on and is co-extensive with one of two parallel lines connecting the corresponding ends of the heel and toe edges of the blank, said blank being further characterized in that the two triangles are equal and inversely similar.

CHARLES G. SHAW.